United States Patent
Poledna

(10) Patent No.: US 8,464,056 B2
(45) Date of Patent: Jun. 11, 2013

(54) METHOD FOR SECURE DYNAMIC BANDWIDTH ALLOCATION IN A TT ETHERNET

(75) Inventor: Stefan Poledna, Klosterneuburg (AT)

(73) Assignee: FTS Computertechnik GmbH, Vienna (AT)

( * ) Notice: Subject to any disclaimer, the term of this patent is extended or adjusted under 35 U.S.C. 154(b) by 314 days.

(21) Appl. No.: 12/936,093

(22) PCT Filed: Apr. 2, 2009

(86) PCT No.: PCT/AT2009/000130
§ 371 (c)(1),
(2), (4) Date: Oct. 21, 2010

(87) PCT Pub. No.: WO2009/121087
PCT Pub. Date: Oct. 8, 2009

(65) Prior Publication Data
US 2011/0066854 A1    Mar. 17, 2011

(30) Foreign Application Priority Data
Apr. 3, 2008    (AT) .................................. A 527/2008

(51) Int. Cl.
*H04L 9/32* (2006.01)
(52) U.S. Cl.
USPC ........... 713/168; 713/150; 713/160; 713/162; 713/171; 709/238; 709/230; 709/207
(58) Field of Classification Search
USPC .... 713/168–170; 709/224–227; 370/208–330
See application file for complete search history.

(56) References Cited

U.S. PATENT DOCUMENTS 7,373,500 B2 * 5/2008 Ramelson et al. ............. 713/150
7,483,449 B2 * 1/2009 Bhandari et al. .............. 370/503

(Continued)

FOREIGN PATENT DOCUMENTS

| EP | 1512254 | 3/2005 |
|---|---|---|
| WO | 2007085028 | 8/2007 |

OTHER PUBLICATIONS

Kopetx H, The Rationale for Time-Triggered Etherent, Nov. 30, 2008, IEEE, vol. 7, pp. 3-11.*
Kopetz, Hermann, et al. "The Time-Triggered Ethernet (TTE) Design", Object-oriented Real-time Distributed Computing, 2005, Eighth IEEE International Symposium, Seattle Washington, USA May 18-20, 2005.
Serafini, Marco et al., "A Tunable Add-On Diagnostic Protocol for Time-Triggered Systems", Dependable Systems and Networks, 2007, 37th Annual IEEE/IFIP International Conference IEEE, Jun. 1, 2007.
International Search Report for PCT application PCT/AT2009/000130, mailed Jul. 7, 2009.

*Primary Examiner* — Nathan Flynn
*Assistant Examiner* — Viral Lakhia
(74) *Attorney, Agent, or Firm* — Joseph E. Maenner; Maenner & Associates, LLC

(57) ABSTRACT

A communication method for transmitting TT Ethernet messages is a distributed real-time system, including a plurality of node computers. Each node computer has an Ethernet controller, which by way of a data line is directly connected to a port of a TTE star coupler, said port being uniquely associated with the node computer. A plurality of TTE star couplers are connected among each other by way of one or more data lines to form a TTE network. A TTE message scheduler dynamically calculates the conflict-free schedules for a number of time-controlled messages and signs the schedule provided for each node with a secret part of a public-key signature before it transmits said schedule to the corresponding node computer. Each node computer integrates the signed periodic schedule, which is transmitted to the node computer in the form of a TTE message header of an ETE message, into each dynamically calculated TTE message. The TTE star couplers check whether each dynamically calculated TTE message contains an authentically signed schedule.

11 Claims, 2 Drawing Sheets

U.S. PATENT DOCUMENTS

| | | | |
|---|---|---|---|
| 7,860,076 B2 * | 12/2010 | Stanwood | 370/348 |
| 7,885,240 B2 * | 2/2011 | Joshi et al. | 370/337 |
| 8,160,097 B2 * | 4/2012 | Cadieux | 370/468 |
| 2005/0060427 A1 * | 3/2005 | Phillips et al. | 709/238 |
| 2005/0267734 A1 * | 12/2005 | Masuyama | 704/2 |
| 2006/0143345 A1 * | 6/2006 | Fredriksson | 710/106 |
| 2008/0232238 A1 * | 9/2008 | Agee | 370/208 |
| 2008/0291839 A1 * | 11/2008 | Hooper et al. | 370/248 |
| 2008/0316966 A1 * | 12/2008 | Joshi et al. | 370/330 |

\* cited by examiner

METHOD FOR SECURE DYNAMIC BANDWIDTH ALLOCATION IN A TT ETHERNET

CROSS REFERENCE TO RELATED APPLICATIONS

The present application is a U.S. National Stage Application of PCT Application Serial No. PCT/AT2009/000130, filed on Apr. 2, 2009, which claims priority from Austrian Patent Application Serial No. A 527/2008, filed on Apr. 3, 2008, both of which are incorporated by reference in their entireties.

FIELD OF THE INVENTION

The invention relates to a method and a device for secure dynamic bandwidth allocation in a TT ethernet corresponding to the claims.

BACKGROUND OF THE INVENTION

EP 1 512 254 discloses a method that enables time-controlled messages with good real-time characteristics to be transmitted over an extended ethernet system (hereafter referred to as a TT-(time-triggered) ethernet). TT ethernets distinguish between two message categories: ETE messages, which are conventional event-triggered messages, and TTE messages, which are new, time-triggered messages.

While ETE messages come from a chronologically uncoordinated, open environment and thus can come into time conflict with one another, it is assumed that all TTE messages in a TT ethernet come from a closed TTE network and can be transmitted in a time-controlled manner corresponding to an a priori conflict-free schedule established by a TTE message scheduler without mutual hindrance. The closed TTE network is composed of a number of node computers that communicate via one or more TTE star couplers. Since the closed TTE network can also have a connection to the open world of ETE messages, or ETE messages can be generated within the TTE network, time conflicts can arise between a TTE message originating from a closed environment and an ETE message originating from an open environment. In such a case of conflict, the transmission of the ETE message in a TT ethernet according to EP 1 512 254 will be interrupted by the TTE star coupler so that the TTE message can be transmitted within a guaranteed short transmission time. The TTE star coupler automatically resumes sending the interrupted ETE message after transmission of the TTE message. The TTE star coupler handles all ETE messages according to the ethernet standard (IEEE Ethernet Standard 802.3, URL: http://standards.ieee.org).

ETE message transmission durations that are longer under certain conditions (interruption and resumed sending of an interrupted ETE message by the TTE star coupler) are standard compliant, since the standard contains no specification for transmission duration.

When a TTE message is to be sent, the schedule can be contained either in the TTE message or in the TTE star coupler (or in both). Storage of the schedule in the TTE star coupler entails the following disadvantages:

(i) When the schedule is modified, not only the sending node computer but all affected TTE star couplers must also be modified.

(ii) The schedule stored in a star coupler can be lost if that star coupler suffers a transient malfunction. The star coupler then malfunctions until a new schedule is obtained from an authorized TTE message scheduler.

This problem does not occur if the schedule information is contained in the TTE message as indicated in EP 1 512 254. However, in this case a defective or malicious node computer can embed a false schedule in the TTE message and thus disrupt all other node computers.

BRIEF SUMMARY OF THE INVENTION

The method according to the present invention described here according to the characteristics of Claim 1 solves the problem discussed above, so that the TTE star coupler remains substantially stateless, that is no schedules must be stored, and in any case a defective or malicious node computer cannot disrupt the communications of other the node computers. This method thus provides for an efficient, dynamic and nevertheless secure bandwidth allocation for TTE messages.

The following significant economic advantages accrue through the present invention:

Real-time data transmission in a TT ethernet system can be modified dynamically, without the need to reprogram the TTE star coupler.

Above all, dynamic modification of schedules is an enormous advantage in the multimedia communications field, since it leads to a significant savings in bandwidth.

The present invention enables a secure, dynamic modification of the bandwidth allocation of TT ethernet (TTE) messages in a distributed real-time computer system in which a number of node computers communicate TTE messages in real time over one or multiple communication channels. Such a secure modification of the bandwidth allocation is of significant importance primarily in multimedia applications.

Additional advantages of the invention are disclosed in the dependent claims.

BRIEF DESCRIPTION OF THE DRAWINGS

The above-described object and other new properties of the present invention are explained further in the diagrams. In these.

DETAILED DESCRIPTION OF THE PRESENT INVENTION

An implementation of the new method in terms of a concrete example is indicated in the following section.

Figure 1:
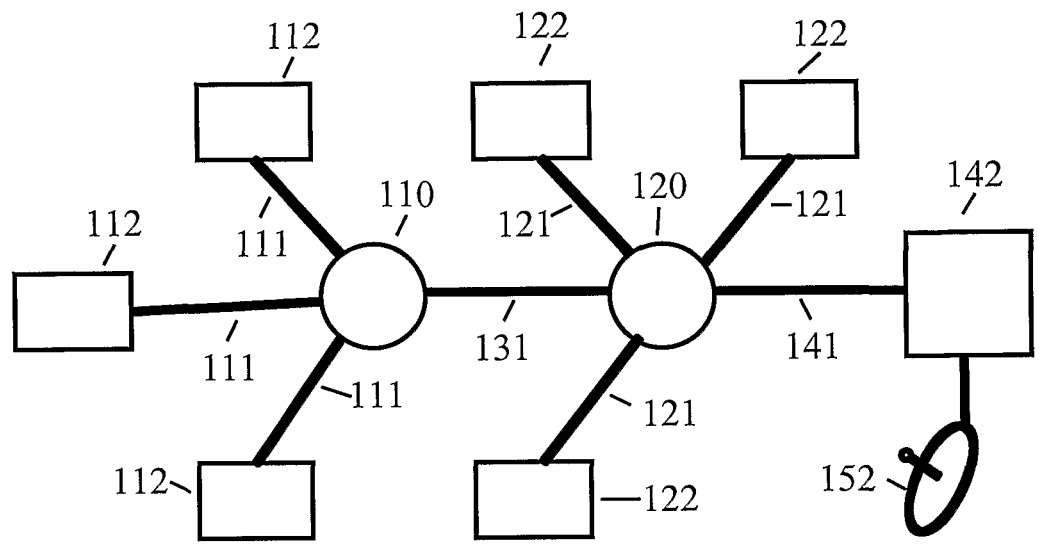
FIG. 1 depicts the constitution of a distributed computer system with two TTE star couplers.

FIG. 1 depicts a distributed computer system with two TTE star couplers 110, 120, whereby three node computers 112 are connected with star coupler 110 via point-to-point connection 111 and three further node computers 122 are connected with star coupler 120 via point-to-point connection 121. A TT ethernet (TTE) service node 142 is connected with star coupler 120 via point-to-point connection 141. TTE service node 142 can be provided with GPS (Global Positioning System) receiver 152, which can receive a time signal with better than 1-μsec accuracy from GPS satellites. Located in TTE service node 142 is a trusted TTE message scheduler that can calculate a new schedule for TTE messages upon request from node computers 112 and 122. This request can be made via ETE messages.

Figure 2:
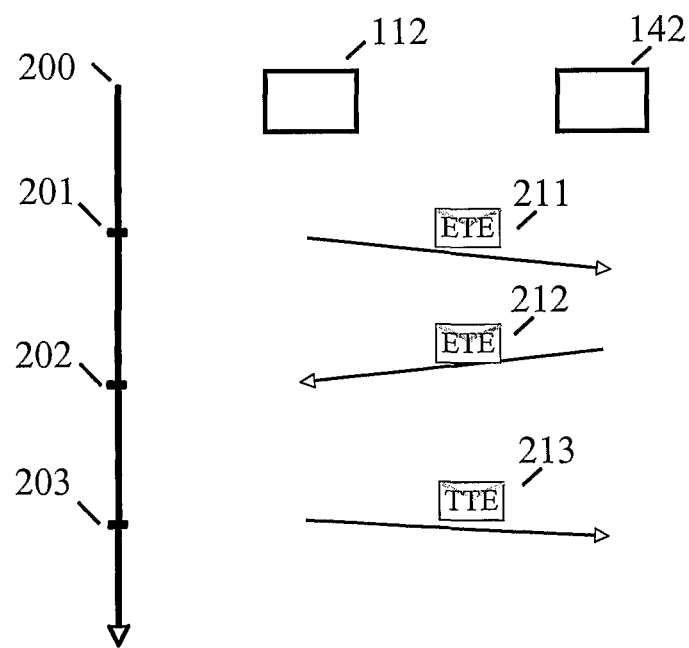
FIG. 2 shows a message sequence that enables a dynamic modification of the schedule.

FIG. 2 depicts a message sequence that enables a dynamic modification of the schedule. The time progression is represented on time axis 200 on the left side. At time point 201, node computer 112 sends ETE message 211 to TTE service node 142 with the request to generate a schedule for a new TTE message sequence. After the schedule for this new TTE message sequence is calculated by the TTE message scheduler, TTE service node 142 sends the new schedule information in the form of TTE message header 320 in ETE message 212 back to node computer 112. Node computer 112 copies TTE message header 320 with the schedule information including signature 309 of TTE service node 142 from message 212 into each TTE message 213 according to FIG. 3, and then sends the first TTE message 213 at the periodic time point 203 contained in message 213 in the TTE network.

Figures 3, 4:
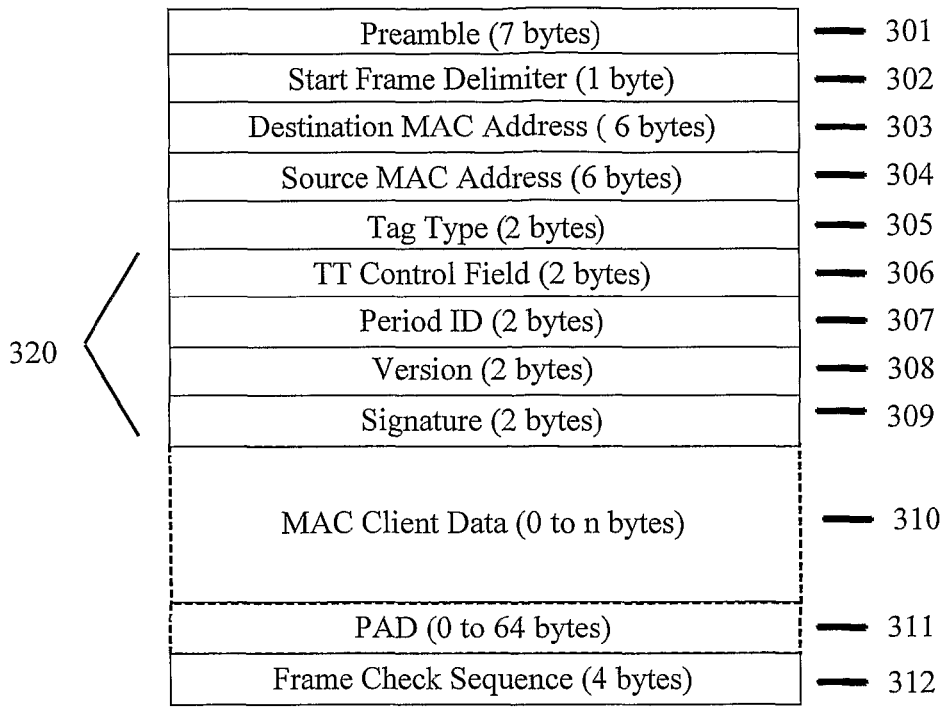
FIG. 3 shows the constitution of a TTE message.
FIG. 4 shows the content of the data fields in a configuration message.

FIG. 3 shows a possible constitution of a real-time TTE message. Fields 301 through 305 and fields 311 through 312 are specified in the ethernet standard. In FIG. 3, two-byte control field 306 is provided. The first byte of field 306 contains control information about the TTE message. The content of control field 306 determines the further format of TTE message header 320, which contains the schedule calculated for this message by the TTE message scheduler. In the example given, TTE message header 320 comprises three fields in addition to control field 306. The period ID of the message is given in field 307. This field is calculated by the TTE message scheduler in service node 142 and determines the period and phase of TTE message 213. Version field 308 is governed by the TTE message scheduler and contains the version identification for the current schedule. Field 309 contains the signature of the TTE message scheduler that is calculated by the TTE message scheduler with the private portion of a symmetrical key pair. The public portion of this key is contained in field 406 of the periodic configuration message (FIG. 4) from TTE service node 142. In simple TTE systems in which safety aspects need play no role except for handling accidental hardware or software defects in a node computer, a symmetrical key process can also be used, or field 406 can contain a simple checksum of fields 306 through 308 of TTE message header 320.

FIG. 4 shows the content of the configuration message from TTE service node 142. This configuration message is sent with an a priori established period as a TTE message from TTE service node 142 to all TTE star couplers 110 and 120 as well as to all node computers 112 and 122. The duration of this period determines the time duration that is needed by a TTE star coupler 110 or 120 to resume full functioning following a transient malfunction. Field 401 contains the sending time point for the configuration message. Since TTE service node 142 knows a priori when the next configuration message must be sent, it can sign the content of the configuration message before the sending time point contained in the message so that the message can be sent at exactly the time point contained in field 401. When TTE service node 142 receives world-wide synchronized GPS time from GPS receiver 152, sending time point 401 can be synchronized with this GPS time. Field 402 contains the version identification for the current schedule. The current version is valid from the time point given in field 403. When the TTE message scheduler knows that a new schedule version must be created in the foreseeable future due to a request from a node computer, the version identification of this future schedule is contained in field 404. The future time point from which this version will be valid is given in field 405. The previous schedule version loses its validity at this time point. The TTE message scheduler must create a new schedule version when the sending time point of at least one message in the new version conflicts with the sending time point of one of the messages in the previous version. Field 406 contains the public portion of the key that is necessary for checking the authenticity of TTE message header 320. Since this key is relatively short to conserve bandwidth, it must be modified frequently by the TTE message scheduler. For example, a new key is provided with each new scheduler version. FIG. 4 contains information on the TTE star coupler connection diagram. This information is necessary to be able to decide whether a TTE message arriving in the star coupler should be delayed until the sending time point contained in the TTE message. Since, according to Austrian patent application A 558/2007, all TTE star couplers have high-precision clock synchronization available, the precision (Kopetz, H. (1997), "Real-Time Systems, Design Principles for Distributed Embedded Applications"; ISBN: 0-7923-9894-7, Boston, Kluwer Academic Publishers) of the sending time points of messages that are forwarded by the TTE star couplers is known and very good system-wide. Therefore, any star coupler can transmit a message coming directly from another star coupler immediately without a delay. However, for a message originating from one of the node computers 112, the relevant star coupler 120 must first check whether TTE message header 320 contained in the TTE message is authentically signed and whether the schedule version is currently valid. The TTE message is then delayed until the periodic time point that is contained in the message and is secured by the signature of the scheduler, so that it can be sent through the TTE network at exactly this point in time. This delay is also necessary to block lower precision of the local clock synchronization in node computer 112, because a node computer can send a TTE message to the TTE star coupler some time before the time point contained in the message. Additionally, this measure also hinders a defective node computer from sending TTE messages into the TTE network at time points that could lead to a conflict with the correct TTE messages from other node computers. Field 408 of the configuration message contains a long signature from TTE service node 142. The content of fields 401 through 407 of the configuration message are secured by this signature. The public portion of the asymmetric key with which this signature can be checked is communicated to the star couplers over a secure channel before the system is operated. Alternatively, this key can also be written in a tamper-resistant register of the TTE star coupler before the system is brought online. We designate a register to be tamper-resistant when its content cannot be modified by an unauthorized entity.

In TTE ethernet systems that are used in security-critical applications, a combination of static and dynamic schedules can be necessary. Since the schedules for security-relevant TTE messages must be certified in many security-critical applications, these certified static schedules must not be modified during operation. These static schedules are therefore stored in nonvolatile memory in the TTE star couplers prior to real-time operation. If a conflict between a certified static TTE message and a dynamic TTE message scheduled by the TTE message scheduler is recognized by the TTE star coupler during operation (e.g., due to a defect in the TTE message scheduler), the TTE star coupler overrules the dynamic TTE message and sends the static TTE message conflict-free. In this case the TTE star coupler sends a diagnostic notice to a service node. This diagnostic notice can be signed by the TTE star coupler to guard against counterfeit diagnostic messages. If any star coupler periodically sends a TTE diagnostic message to a service node, these TTE diagnostic messages can be interpreted as the star coupler's vital signs (heartbeat) and can serve for the rapid detection of malfunction in a TTE star coupler.

The concrete embodiment of the present invention described here presents only one of many possible embodiments of this invention.

What is claimed is:

1. A communication method for transmission of time-triggered (TT) ethernet messages over a distributed real-time system, comprising a plurality of node computers, whereby each node computer is provided with at least one ethernet controller that is directly connected via a data line to a port on a TT Ethernet (TTE) star coupler that is uniquely assigned to one of the node computers, and whereby multiple TTE star couplers are connected directly or indirectly to one another via one or more data lines to form a TTE network, wherein a TTE message scheduler dynamically calculates conflict-free schedules for a number of time-controlled messages and signs the schedule designated for each node with the private portion of a public key signature before it sends this schedule to the corresponding node computer, and whereby the signed periodic schedule that is sent by the TTE message scheduler to the node computer in the form of a TTE message header in an event-triggered ethernet (ETE) message is incorporated by each node computer into each dynamically calculated TTE message, and whereby the TTE star coupler checks whether each dynamically calculated TTE message contains an authentically signed schedule:

wherein the conflict-free schedule is signed with a simple symmetrical key before this schedule is sent to the corresponding node computer, and whereby each node computer incorporates the signed periodic schedule of the TTE message header into each dynamically calculated TTE message, and whereby the TTE star coupler checks whether each dynamically calculated TTE message contains an authentically signed schedule;

wherein all star couplers include a configuration message from a service node that contains the following: sending time point for the message, current schedule version, starting time point for the validity of the current schedule version, subsequent schedule version, starting time point for the validity of the subsequent schedule version, current public key for checking the scheduler signature of a TTE message, and the connection structure of the TTE star coupler, whereby the message content is secured through the electronic signature of the TIE message scheduler;

wherein the service nodes modify the key used in the calculation of TTE header during operation; and wherein each star coupler is notified of the public key of the TTE service node a priori over a secure channel.

2. The communication method as recited in claim 1, wherein the service node establishes and signs a configuration message before the sending time point contained in the message, and begins sending exactly at the sending time point contained in the configuration message.

3. The communication method as recited in claim 1, wherein the star coupler periodically sends this secured configuration message, whereby the sending period and phase are contained in the configuration message, and where the receiving time point for this message is used by the TTE star couplers and the node computers for synchronizing their clocks.

4. The communication method as recited in claim 1, wherein a TTE message from a node computer arriving at a proximate star coupler will then be released for retransmission from the TTE star coupler if and only if the sending time point contained in the message matches the TTE star coupler time.

5. The communication method as recited claim 1, wherein a TTE message received from one star coupler is immediately released for retransmission by the next star coupler.

6. The communication method as recited in claim 1, wherein there is differentiation between static TTE schedules and dynamic TTE schedules.

7. The communication method as recited in claim 1, wherein the time point of release for retransmission of the static schedule in the TTE star coupler is a priori stored in non-volatile memory.

8. The communication method as recited in claim 1, wherein a dynamically scheduled TTE message is overruled or placed in a queue by a star coupler if its schedule has a time conflict with a statically scheduled TTE message.

9. The communication method as recited in claim 1, wherein each star coupler periodically releases a TTE diagnostic message for transmission to the service node exactly at the sending time point contained in the message.

10. The communication method as recited in claim 9, wherein the diagnostic message is signed by the star coupler.

11. A TTE star coupler for relaying TTE ethernet messages over a distributed real-time system comprising a plurality of node computers, whereby each node computer has available at least one ethernet controller that is directly connected via a data line to a port on a TTE star coupler that is uniquely assigned to one of the node computers, wherein the TTE star coupler is equipped to implement a method as recited in claim 1.

* * * * *